United States Patent [19]
Brigham et al.

[11] Patent Number: 4,739,201
[45] Date of Patent: Apr. 19, 1988

[54] MEANS TO REDUCE HARMONIC TORQUE IN ELECTROMAGNETIC MACHINES

[75] Inventors: Robert N. Brigham, Monroe; Joseph R. Vivirito, Windsor, both of Conn.

[73] Assignee: The Superior Electric Company, Bristol, Conn.

[21] Appl. No.: 889,529

[22] Filed: Jul. 25, 1986

[51] Int. Cl.$^4$ .......................................... H02K 37/00
[52] U.S. Cl. ................................ 310/49 R; 310/156; 310/112
[58] Field of Search .......... 310/49, 112, 114, 162–165, 310/156

[56] References Cited

U.S. PATENT DOCUMENTS

| | | | |
|---|---|---|---|
| 3,956,650 | 5/1976 | Field, II | 310/156 |
| 4,127,802 | 11/1978 | Johnson | 310/49 X |
| 4,206,374 | 6/1980 | Goddijn | 310/49 |
| 4,255,696 | 3/1981 | Field, II | 310/49 X |
| 4,306,164 | 12/1981 | Itoh et al. | 310/156 X |
| 4,327,299 | 4/1982 | Goddijn | 310/49 |

Primary Examiner—Donovan F. Duggan
Attorney, Agent, or Firm—John H. Crozier

[57] ABSTRACT

An electromagnetic machine of the type having a moving member and a stationary member, with a set of structures on the moving member to magnetically interact with a set of structures on the stationary member, has an improved construction comprising displacing by an angle of displacement, $\alpha_m$, from their normal positions, a first portion of one set of structures whereby the displacement causes a harmonic of the fundamental torque/angle curve to be attenuated. The angle of displacement is determined by the following relationship:

$$\alpha_m = \alpha_e / p,$$

where
 $\alpha_e$ = displacement in electrical degrees,
 p = number of moving member magnetic pole pairs,
 further where $\alpha_e = 180/h$,
 where h = an integer equal to the number of a harmonic of the fundamental torque/angle curve to be attenuated.

13 Claims, 4 Drawing Sheets

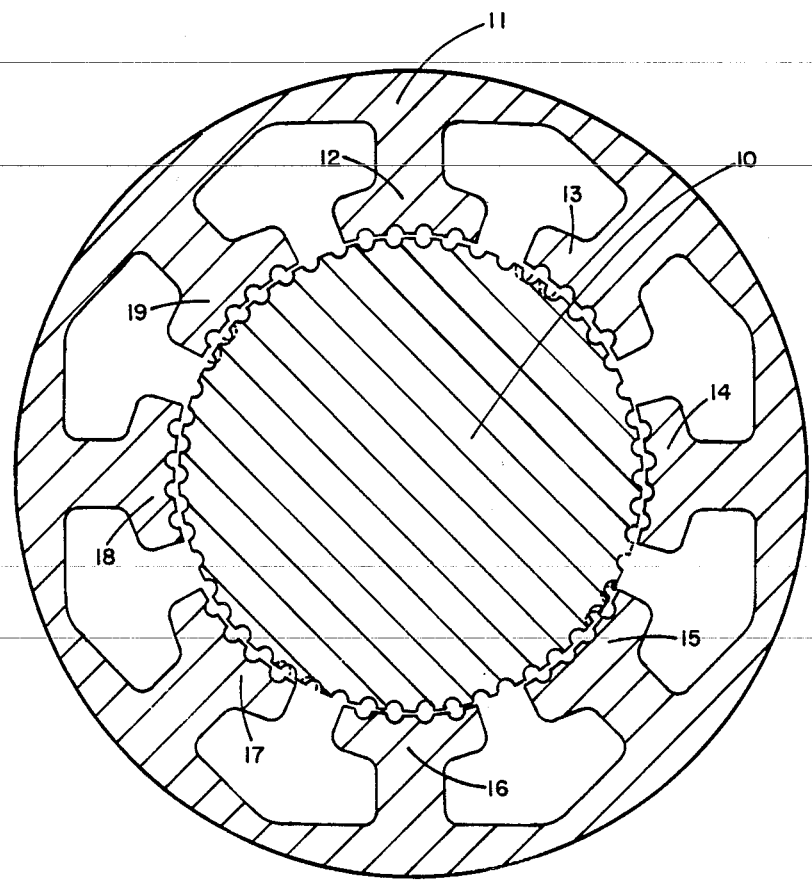
FIG. I(a)
(PRIOR ART)

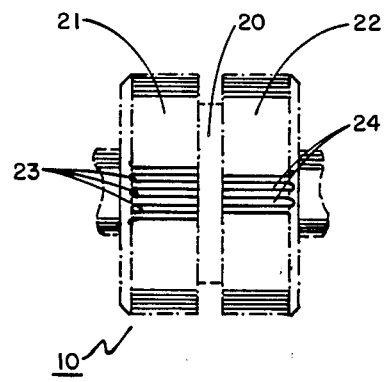
FIG. I(b)
(PRIOR ART)
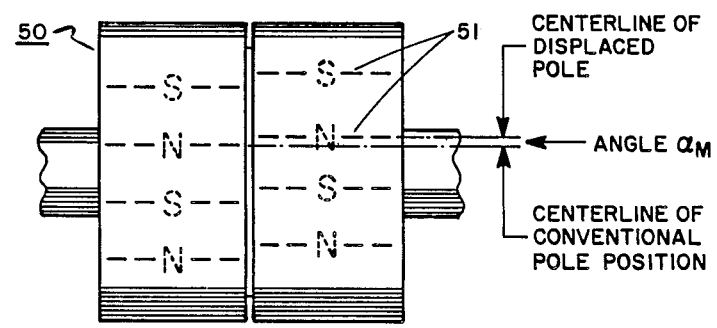
FIG. 7

MEANS TO REDUCE HARMONIC TORQUE IN ELECTROMAGNETIC MACHINES

BACKGROUND OF THE INVENTION

1. Technical Field

This invention relates to electromagnetic machines, and more particularly to an improved design which reduces a given harmonic of the fundamental torque/-displacement-angle relationship. While the invention is described, for convenience, as applied to rotary motors, it will be understood that it may be applied to linear motors, as well as to other electromagnetic machines having stationary and moving members, such as signal generating devices and electric power generators and other electric power producing devices. It has been found to be particularly useful when applied to rotary brushless DC, stepping and synchronous inductor motors.

2. Background Art

Rotary brushless DC, stepping, and synchronous inductor motors are well known in the art. Each type includes a rotor (moving member) and a stator (stationary member), with the stator having a plurality of salient poles energized by the passage of electric current through coils wound upon the poles. The coils are so arranged as to provide at least two electrical phases. The rotor includes at least one pair of N-S magnetic poles which are flux-linked with the stator poles, so that successive energizations of the phases provide rotary motion of the rotor.

The torque/displacement-angle of the rotor relationship, "torque/angle curve", between a rotor pole and each of the stator poles, may be expressed in general by the well known Fourier expansion:

$$T = k[1 + A_1 \cos \theta_e + A_2 \cos (2\theta_e) \ldots A_n \cos (n\theta_e) + B_1 \sin \theta_e + B_2 \sin (2\theta_e) \ldots + B_n \sin (n\theta_e)],$$

where
T = torque,
k = a constant,
$A_1, A_2 \ldots A_n$ = Fourier Coefficients (constants) of the cosine terms,
$B_1, B_2 \ldots B_n$ = Fourier Coefficients (constants) of the sine terms, and
$\theta_e$ = the displacement of the rotor in electrical degrees.

In the above equation, $A_1 \cos \theta_e + B_1 \sin \theta_e$ represents the fundamental (first) harmonic produced as the rotor poles pass the stator poles; $A_2 \cos 2\theta_e + B_2 \sin 2\theta_e$ is the second harmonic of the fundamental; and so forth.

In the special case in which $\theta_e = 0$ is defined as the rotor position for which the centerline of the rotor pole coincides with the centerline of the stator pole for which the Fourier expansion is being written, the expansion is greatly simplified to $$T = K[B_1 \sin \theta_e + B_2 \sin (2\theta_e) + \ldots + B_n \sin (n\theta_e)]$$

It is well known that the presence of torque/angle harmonics is especially detrimental to the performance of synchronous inductor motors, stepping motors, and brushless D.C. motors. In particular, a harmonic of the order corresponding to twice the number of phases (e.g. 4th harmonic for a 2-phase machine, 6th harmonic for a 3-phase machine, etc.) is particularly detrimental because of its dominance in the distribution of harmonic content. This particular harmonic is responsible for "detent torque", an objectionable resistance to rotation of the rotor of a de-energized motor. Step accuracy of a step motor, velocity modulation of synchronous inductor motors, stepping motors, and brushless D.C. motors, and microstepping ability of stepping motors and brushless D.C. motors are all adversely affected by torque/angle harmonics, and particularly by the one responsible for detent torque as described above.

It would be advantageous in such motors to be able to minimize the dominant harmonic which adversely affects motor performance as described above.

In copending Application Ser. No. 06/782,932, assigned to the assignee of the present application, there is disclosed means for minimizing a given harmonic the torque/angle curve of motors by providing a stator with two sets of poles, the sets of poles being nonuniformly spaced according to a specified relationship. While that arrangement satisfactorily reduces the undesired harmonic, the nonuniform stator slot widths cause certain complexities, the size of the stator coils is restricted practically by the narrowest slot, and the windings must be specially oriented with respect to the stator.

SUMMARY OF THE INVENTION

The present invention provides for minimization of a given harmonic of the torque/angle curve by providing a motor having first and second rotor/stator combinations, the two combinations being so arranged that, although each produces the harmonic to be minimized, the harmonic produced by one cancels the harmonic produced by the other. This result is achieved by displacing a first set of stator pole teeth (or poles) from a second set of stator pole teeth (or poles) or by displacing a first set of rotor teeth from a second set of rotor teeth, such displacement being a given increment greater or smaller than any displacement that may exist in conventional construction.

Thus, with the appropriate harmonic substantially reduced, the adverse effect on performance in brushless DC, stepping, and synchronous inductor motors due to the presence of that harmonic can be reduced, and performance in brushless DC and stepping motors can be improved.

BRIEF DESCRIPTION OF THE DRAWING

FIG. 1(a) is a schematic of a conventionally constructed motor.

FIG. 1(b) is a detail of FIG. 1(a).

FIGS. 4 through 7 show embodiments of the present invention.

DETAILED DESCRIPTION OF THE PREFERRED EMBODIMENT

Figure 2:
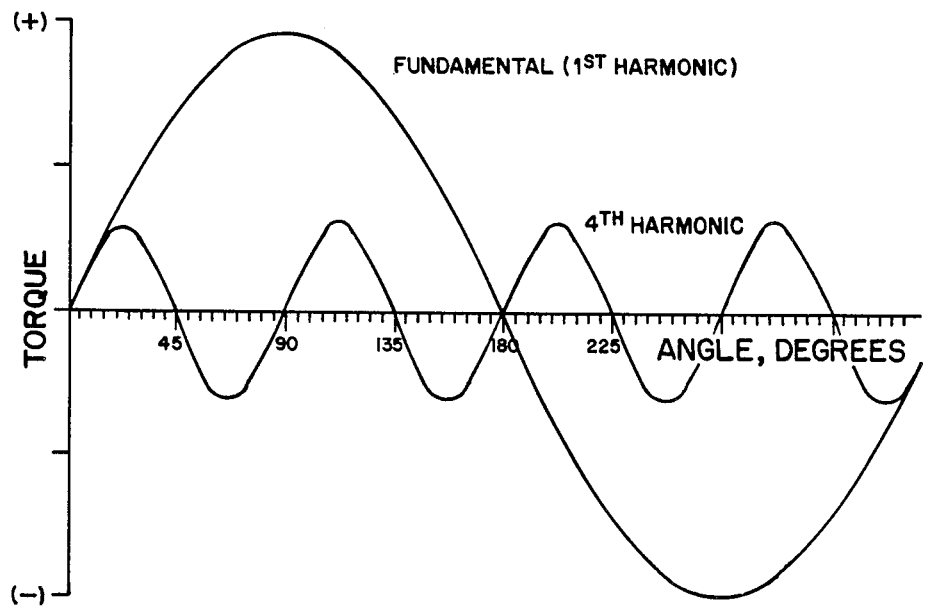
FIG. 2 shows the torque/angle curve for a conventional motor.

FIG. 1(a) shows diagrammatically in cross section a portion of a conventionally constructed motor, which may assumed to be a two-phase, eight-pole-stator synchronous inductor motor. Shown are a toothed rotor 10 and a toothed stator 11, the stator having poles 12 through 19 upon which energizing coils (not shown) can be wound. FIG. 1(b) shows a portion of the rotor 10 which includes an axially-magnetized permanent magnet 20 and pole pieces 21 and 22 mounted with the magnet as shown, with pole piece 21 having a N magnetization and pole piece 22 having a S magnetization. The periphery of each pole piece is formed to have periphery teeth 23 for the pole piece 21 and periphery teeth 24 for the pole piece 22. As shown on FIG. 1(a), each periphery tooth is identical and the teeth are equally spaced; but as shown in FIG. 1(b), the pole piece 21 is placed so that its teeth 23 are radially displaced one-half a tooth pitch from the teeth 24 on the pole piece 22.

Rotation of the motor shown on FIG. 1(a) is caused by a unidirectional magnetic field being attracted to and following a rotating magnetic field. The unidirectional field in the motor illustrated is produced by the permanent magnet forming a part of the rotor 10. The stator 11 has a two phase winding with alternate poles being energized by the same phase. When the windings are connected to a source of alternating current, during one-half of the cycle of alternating current, each of the poles will have a magnetic polarity and on the other half of the cycle they will have the opposite polarity. Thus in the poles energized by one phase of the winding, one pole will for example be north, the next one south, the next north, during one-half of the cycle and in subsequent half cycles they become south, north, south, etc. The poles energized by the other phase of the winding will have a similar magnetic polarity except that it is about 90° out of phase with the first set of poles. Accordingly, rotation is produced by the unidirectional field being first attracted and then repelled by the change in the polarity in the poles. The rotating speed of the motor using a constant cycle alternating source is varied by mechanical construction features such as the number of poles of the stator and the configuration of the rotor and stator poles.

The fundamental torque/angle curve of each half of the rotor 10 of FIG. 1(b) is given by $$T = K[B_1 \sin \theta_e + B_2 \sin 2\theta_e + \ldots B_n \sin (n\theta_e)],$$

where the symbols are the same as described above, which relationship is shown graphically on FIG. 2. While the fundamental curve is correctly shown as an undistorted sine wave, it will be understood that a curve representing total torque would be distorted, it being the total of the fundamental and harmonics of the fundamental, and it is this distortion that contributes to velocity modulations in brushless DC, stepping, and synchronous inductor motors and to reduced step and microstep accuracy in brushless DC and stepping motors. It has been found that, for the two-phase, eight-pole stator of FIG. 1(a), the harmonic that contributes most to the accuracy and velocity modulation problems discussed above is the fourth harmonic which is also shown on FIG. 2. The present invention eliminates or substantially attenuates the fourth harmonic for this case, as described below.

The motor described in connection with FIGS. 1(a) and 1(b) may be modified in accordance with the teaching of this invention by displacing one set of rotor teeth 23 from the other set of rotor teeth 24 by an angle $\alpha_e$ from their normal displacement of 180 degrees electrical to eliminate one of the harmonics in the torque vs. angle waveform. Each half of the motor rotor 10, may be thought of as an independent contributor to the total motor torque, with the torque contributed by the halves represented by $T_A$ and $T_B$, with the total torque represented by $T_T = T_A + T_B$.

If the halves of the rotor are shifted radially from their normal positions by $\alpha_e$ degrees electrical, the torque equations become:

$$T_A = K_A[B_1 \sin \theta_e + B_2 \sin (2\theta_e) + \cdots + B_n \sin (n\theta_e)]$$

and $$T_B = K_B[B_1 \sin (\theta_e + \alpha_e) + B_2 \sin (2\theta_e + 2\alpha_e) + \cdots + B_n \sin (n\theta_e + n\alpha_e)]$$

If only the fundamental and the fourth harmonic are present, the above equations reduce to (if $K_A = K_B = 1.0$):

$$T_A = K_A[B_1 \sin \theta_e + B_4(4\theta_e)]$$

$$T_B = K_B[B_1 \sin (\theta_e + \alpha_e) + B_4 \sin (4\theta_e + 4\alpha_e)]$$

and $$T_T = T_A + T_B = 2B_1 \cos(-\alpha_e/2) \sin (\theta_e + \alpha_e/2) + 2B_4 \cos(-2\alpha_e) \sin (4\theta_e + 2\alpha_e).$$

Figure 3:
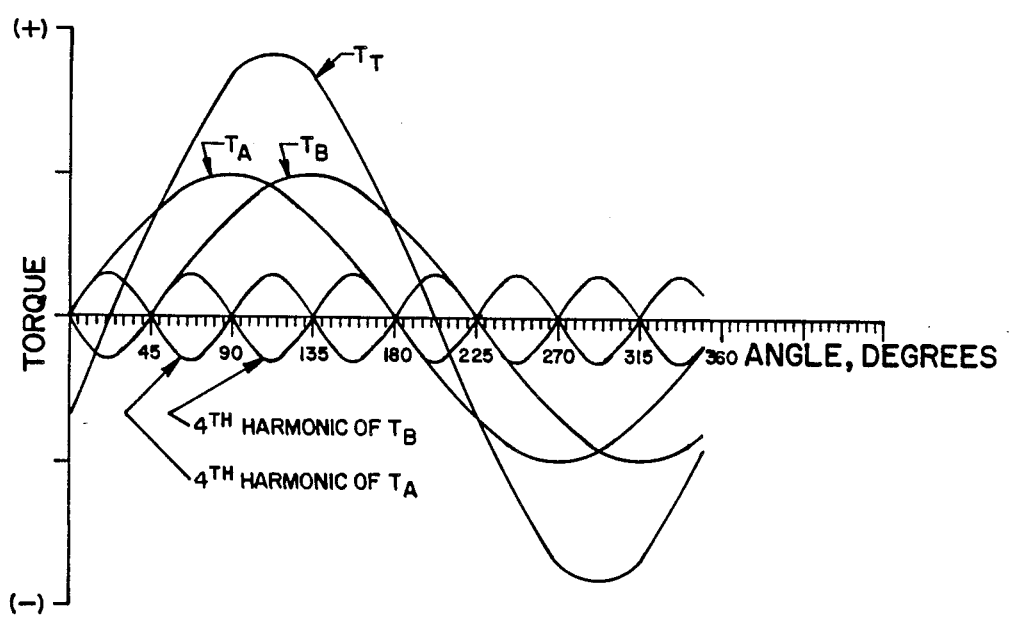
FIG. 3 shows the torque/angle curve for a two-phase motor constructed according to the present invention.

When $\alpha_e = 45$ degrees electrical, $\cos(-2\alpha_e) = 0$, and the fourth harmonic term of $T_T$ is reduced to zero, thereby eliminating the effects of the fourth harmonic torque component. This is illustrated graphically on FIG. 3. $T_B$ leads $T_A$ by 45 degrees electrical and the fourth harmonics of $T_A$ and $T_B$ cancel, being displaced 180 degrees electrical.

In the same manner, any other torque harmonic can be eliminated by the proper choice of displacement angle, $\alpha_e$.

The necessary angle of displacement is determined by the relationship $\alpha_e = 180°/h$, where h is the harmonic to be minimized, and, therefore, where the harmonic to be attenuated is the fourth, the displacement angle is 45 degrees electrical. Electrical degrees and mechanical degrees are related by the expression $$\alpha_m = \alpha_e/p$$

where $\alpha_e$ = displacement in electrical degrees,
$\alpha_m$ = displacement in mechanical degrees, and
p = number of rotor pole pairs.

Figure 4:
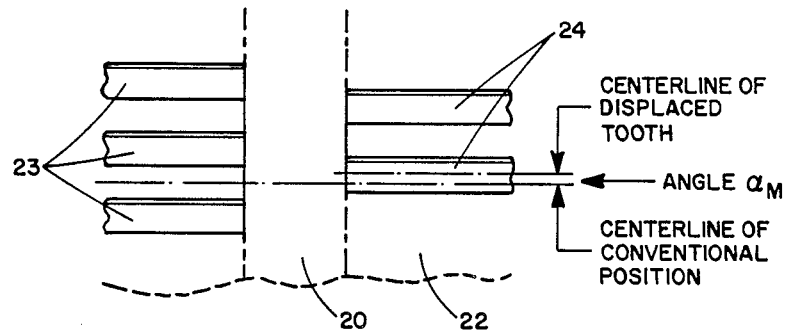

FIG. 4 shows the rotor 10 of FIG. 1(b) constructed according to the present invention, with the pole pieces 21 and 22 displaced from their normal positions by an angle, $\alpha_m$. It is unimportant to the practising of the present invention whether the displacement angle, $\alpha_m$, is in the direction shown or in the opposite direction.

Figure 5:
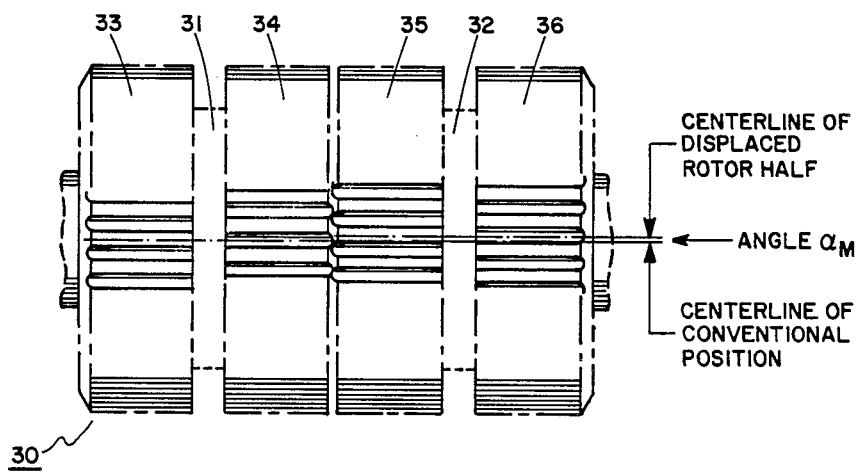

FIG. 5 shows a two-magnet rotor constructed according to the present invention, and generally indicated by the reference numeral 30. Magnets 31 and 32 have pole pieces 33 and 34, and 35 and 36, respectively, all assembled along a common axis as shown, with the teeth of pole pieces 34 and 35 normally offset ½ tooth pitch. Pole piece 33 is offset ½ tooth pitch from pole piece 34 and pole piece 35 is offset ½ tooth pitch from pole piece 36. In this embodiment, pole pieces 33 through 36 may be magnetized S, N, S, N or N, S, N, S, respectively. The displacement angle, $\alpha_m$, in this embodiment is achieved by radially offsetting the two halves of the rotor 30 as shown.

Figure 6:
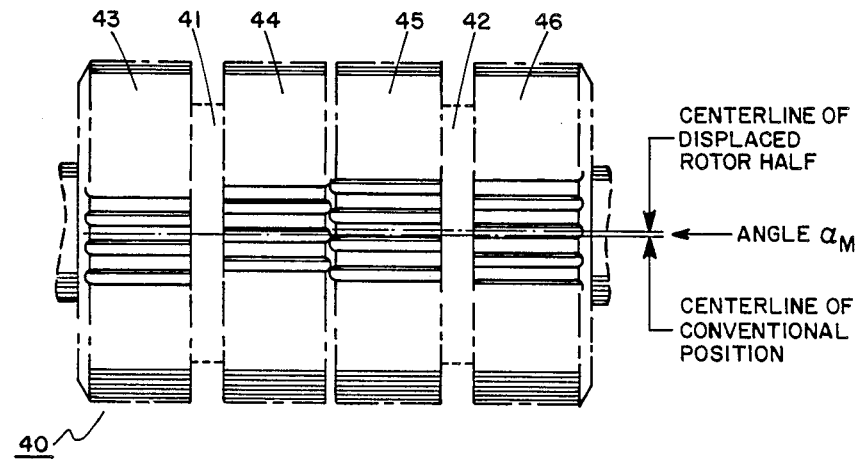

FIG. 6 shows a two-magnet rotor, constructed according to the present invention, and generally indicated by the reference numeral 40. Magnets 41 and 42 have pole pieces 43 and 44, and 45 and 46, respectively, all assembled along a common axis as shown with the teeth of pole pieces 44 and 45 normally in alignment. Pole piece 44 is offset ½ tooth pitch from pole piece 44 and pole piece 45 is offset ½ tooth pitch from pole piece 46. Pole pieces 43 and 46 are shown as having a S magnetization and pole pieces 44 and 45 are ashown as having a N magnetization, although they could have opposite magnetizations, respectively. The displacement angle, $\alpha_m$, in this embodiment is achieved by radially offsetting the two halves of the rotor 40 as shown.

FIG. 7 shows an untoothed magnetic rotor, indicated generally by the reference numeral 50, which is radially magnetized, rather than axially magnetized as was the case on FIGS. 4, 5, and 6. Here the rotor has N and S non-salient poles magnetized on its periphery and uniformly spaced, as at 51. The rotor actually comprises two magnets 52 and 53 which are displaced by the angle $\alpha_m$ according to the present invention.

The present invention is not limited to providing minimization of the fourth harmonic. For example, in a three-phase motor, it is found that the sixth harmonic causes the accuracy and velocity modulation problems discussed above. Through the relationship $\alpha_e = 180°/h$, it is seen that a displacement of 30 degrees electrical is required and such may be obtained as hereinbefore discussed. Also, the present invention is not limited to the stator/rotor configuration chosen for illustration and it will be apparent to one skilled in the art that it can be applied, as well, to other stator/rotor configurations. Furthermore, it will be understood that the invention disclosed is not limited to those cases where it is desired to minimize the problems with velocity modulation and accuracy discussed above, but also to any case where it is desired to minimize a given harmonic of the fundamental torque/angle curve.

The foregoing invention is applicable to any number of stator poles, rotor teeth, and number of phases. It can also be applied to multiple stacks of magnets and rotor pole pieces.

While the present invention has been described as applied to a motor having toothed stator and rotor structures, with halves of the rotor being normally displaced, it may be applied as well to other motor configurations. As examples: Some motors with toothed stators and rotors have the rotor teeth all aligned and halves of the stator teeth normally displaced by one-half tooth pitch. In that case the two halves of the stator would be offset additionally by the displacement angle determined as above. Also, the same principles of the invention apply to motors having shifted stator teeth and untoothed rotors, and to motors having shifted rotor teeth and untoothed stator poles. Further, it is not required for the practising of the invention that the rotor be of the permanent magnet type. Moreover, the displacement need not be taken entirely in either the stator or the rotor, but both could take part of the displacement, as long as the total displacement produces the desired result.

The invention is applicable as well to other types of electromagnetic machines having stationary and moving members, such as linear motors, signal generating devices, and electric power generators and other electric power producing devices.

It will be understood that what has been disclosed is a novel method for minimizing a given harmonic of the fundamental torque/angle curve.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

We claim:

1. In an electromagnetic machine of the type having a moving member and a stationary member, with a set of structures on the moving member to magnetically interact with a set of structures on the stationary member, the improvement comprising displacing by an angle of displacement, $\alpha_m$, from their normal positions, a first portion of one set of structures from a second portion of that set of structures;
where:

$$\alpha_m = \alpha_e/p,$$

where
$\alpha_e$ = displacement in electrical degrees,
p = number of moving member magnetic pole pairs,
further where $$\alpha_e = 180/h,$$

where h = an integer equal to the number of a harmonic of the fundamental torque/angle curve to be attenuated.

2. An electromagnetic machine, as defined in claim 1, wherein:
  (a) the moving member is a rotor; and
  (b) the stationary member includes a set of poles radially disposed about the rotor.

3. An electromagnetic machine, comprising:
  (a) a rotor having a cylindrical, axially-magnetized magnet with cylindrical pole pieces on the ends thereof, the pole pieces having equally-spaced longitudinal teeth formed on their peripheries, the teeth of one pole piece being radially displaced from the teeth on the other pole piece by one-half tooth pitch plus an angle, $\alpha_m$;
  (b) a set of stator poles radially disposed about the rotor to magnetically interact with the rotor; and
  (c) where:

$$\alpha_m = \alpha_e/p,$$

where
$\alpha_e$ = displacement in electrical degrees,
p = number of rotor magnetic pole pairs,
further where $$\alpha_e = 180/h,$$

where h = an integer equal to the number of a harmonic of the fundamental torque/angle curve to be attenuated.

4. An electromagnetic machine, comprising:
  (a) an untoothed rotor having a cylindrical, radially magnetized surface with two sets of alternate N and S magnetic poles displaced symmetrically thereon, the poles of one set being radially displaced from the poles of the other set, such that an N pole of one set is displaced from the corresponding N pole of the other set by one-half pole pitch plus an angle, $a_m$;

(b) a set of stator poles radially disposed about the rotor to magnetically interact with the rotor; and (c) where:

$$a_m = a_e/p,$$

where $a_e$ = displacement in electrical degrees, p = number of rotor magnetic pole pairs, further where $$a_e = 180/h,$$

where h = an integer equal to the number of a harmonic of the fundamental torque/angle curve to be attenuated.

5. An electromagnetic machine, comprising:
(a) a rotor having two axially-aligned, axially-magnetized, cylindrical magnets, each having a cylindrical pole piece on each end thereof, the magnets and pole pieces being in axial alignment, the pole pieces having uniform and equally-spaced teeth on their peripheries, the teeth of one pole piece on each magnet being displaced from the teeth of the other pole piece on each magnet by one-half tooth pitch, and the teeth of the pole pieces on one magnet being radially displaced from the teeth of the corresponding pole pieces on the other magnet by an angle, $a_m$;
(b) a set of stator poles radially disposed about the rotor to magnetically interact with the rotor; and
(c) where:

$$a_m = a_e/p,$$

where $a_e$ = displacement in electrical degrees, p = number of rotor magnetic pole pairs, further where $$a_e = 180/h,$$

where h = an integer equal to the number of a harmonic of the fundamental torque/angle curve to be attenuated.

6. An electromagnetic machine, comprising:
(a) a toothed, axially-magnetized rotor;
(b) a set of stator poles radially disposed about the rotor to magnetically interact with the rotor, the stator poles being axially divided into two sections, with one section being radially displaced from the other section by one-half a rotor tooth pitch plus an angle, $a_m$; and
(c) where:

$$a_m = a_e/p,$$

where $a_e$ = displacement in electrical degrees, p = number of rotor magnetic pole pairs, further where $$a_e = 180/h,$$

where h = an integer equal to the number of a harmonic of the fundamental torque/angle curve to be attenuated.

7. An electromagnetic machine, comprising:
(a) a toothed, axially-magnetized rotor;
(b) a set of stator poles radially disposed about the rotor to magnetically interact with the rotor, the stator poles having teeth on the surface facing the rotor, the stator poles being axially divided into sections, and the teeth on one section being radially displaced from the teeth on the other section by one-half a rotor tooth pitch plus an angle $a_m$; and
(c) where:

$$a_m = a_e/p,$$

where
$a_e$ = displacement in electrical degrees,
p = number of rotor magnetic pole pairs,
further where $$a_e = 180/h,$$

where h = an integer equal to the number of a harmonic of the fundamental torque/angle curve to be attenuated.

8. An electromagnetic machine, comprising:
(a) a rotor having a cylindrical, axially-magnetized magnet with cylindrical pole pieces on the ends thereof, the pole pieces having equally-spaced longitudinal teeth formed on their peripheries, the teeth of one pole piece being radially displaced from the teeth on the other pole piece by one-half tooth pitch minus an angle, $a_m$;
(b) a set of stator poles radially disposed about the rotor to magnetically interact with the rotor; and
(c) where:

$$a_m = a_e/p,$$

where $a_e$ = displacement in electrical degrees, p = number of rotor magnetic pole pairs, further where $$a_e = 180/h,$$

where h = an integer equal to the number of a harmonic of the fundamental torque/angle curve to be attenuated.

9. An electromagnetic machine, comprising:
(a) an untoothed rotor having a cylindrical, radially magnetized surface with two sets of alternate N and S magnetic poles displaced symmetrically thereon, the poles of one set being radially displaced from the poles of the other set, such that an N pole of one set is radially displaced from the corresponding N pole of the other set by one-half pole pitch minus an angle, $a_m$;
(b) a set of stator poles radially disposed about the rotor to magnetically interact with the rotor; and
(c) where:

$$a_m = a_e/p,$$

where $a_e$ = displacement in electrical degrees, p = number of rotor magnetic pole pairs, further where $$a_e = 180/h,$$

where h = an integer equal to the number of a harmonic of the fundamental torque/angle curve to be attenuated.

10. An electromagnetic machine, comprising:

(a) a toothed, axially-magnetized rotor;
(b) a set of stator poles radially disposed about the rotor to magnetically interact with the rotor, the stator poles being axially divided into two sections, with one section being radially displaced from the other section by one-half a rotor tooth pitch minus an angle, $\alpha_m$; and
(c) where:

$$\alpha_m = \alpha_e/p,$$

where $\alpha_e$=displacement in electrical degrees, p=number of rotor magnetic pole pairs, further where $$\alpha_e = 180/h,$$

where h=an integer equal to the number of a harmonic of the fundamental torque/angle curve to be attenuated.

11. An electromagnetic machine, comprising:
(a) a toothed, axially-magnetized rotor;
(b) a set of stator poles radially disposed about the rotor to magnetically interact with the rotor, the stator poles having teeth on the surface facing the rotor, the stator poles being axially divided into sections, and the teeth on one section being displaced from the teeth on the other section by one-half a rotor tooth pitch minus an angle, $\alpha_m$; and
(c) where:

$$\alpha_m = \alpha_e/p,$$

where $\alpha_e$=displacement in electrical degrees, p=number of rotor magnetic pole pairs, further where $$\alpha_e = 180/h,$$

where h=an integer equal to the number of a harmonic of the fundamental torque/angle curve to be attenuated.

12. The invention, as defined in any of claims 1 through 11, wherein the electromagnetic machine is a motor.

13. The invention, as defined in any of claims 1 through 11, wherein the electromagnetic machine is a generator.

* * * * *